US012592998B2

(12) United States Patent
Asai

(10) Patent No.: US 12,592,998 B2
(45) Date of Patent: Mar. 31, 2026

(54) INFORMATION PROCESSING DEVICE FOR DETERMINING WHETHER UPDATING THE FIRMWARE OF AN MFP IS NECESSARY

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 366 days.

(21) Appl. No.: 16/944,404

(22) Filed: Jul. 31, 2020

(65) Prior Publication Data

US 2020/0366806 A1      Nov. 19, 2020

Related U.S. Application Data

(63) Continuation of application No. 16/142,278, filed on Sep. 26, 2018, now Pat. No. 10,735,616.

(30) Foreign Application Priority Data

Sep. 29, 2017      (JP) ................................. 2017-189650

(51) Int. Cl.
*H04N 1/00* (2006.01)
*H04L 67/00* (2022.01)

(52) U.S. Cl.
CPC ......... *H04N 1/00973* (2013.01); *H04L 67/34* (2013.01); *H04N 1/00244* (2013.01);
(Continued)

(58) Field of Classification Search
CPC ........... H04N 1/00973; H04N 1/00307; H04N 1/0048
See application file for complete search history.

(56) References Cited

U.S. PATENT DOCUMENTS

2011/0286022 A1* 11/2011 Kakitsuba ............. G06F 3/1288
                                                                  358/1.13
2012/0180034 A1      7/2012 Hatamoto et al.
(Continued)

FOREIGN PATENT DOCUMENTS

JP        2011-243067 A      12/2011
JP        2012-049996 A      3/2012
(Continued)

OTHER PUBLICATIONS

Office Action dated Jan. 10, 2019 from related U.S. Appl. No. 16/142,278.
(Continued)

*Primary Examiner* — Benjamin O Dulaney
(74) *Attorney, Agent, or Firm* — Scully, Scott, Murphy & Presser, P.C.

(57)      ABSTRACT

A non-transitory computer-readable medium has control instructions to control a computer of an information processing device including a communication interface used to perform communications with an image processing apparatus, and the control instructions cause the computer to perform: determining whether updating of firmware of the image processing apparatus is necessary to execute specific processing in the image processing apparatus; and outputting information based on a result of the determining.

9 Claims, 12 Drawing Sheets

(52) U.S. Cl.
CPC ....... *H04N 1/00307* (2013.01); *H04N 1/0048* (2013.01); *H04N 2201/0094* (2013.01)

(56)                    References Cited

U.S. PATENT DOCUMENTS

| | | | |
|---|---|---|---|
| 2014/0355048 A1* | 12/2014 | Kang .................... | H04W 12/04 |
| | | | 358/1.15 |
| 2016/0255233 A1 | 9/2016 | Oguma et al. | |
| 2016/0337544 A1 | 11/2016 | Han | |
| 2017/0011286 A1* | 1/2017 | Kouguchi .......... | G06K 15/1868 |
| 2017/0153780 A1* | 6/2017 | Asai ................... | H04N 1/00973 |
| 2017/0223127 A1 | 8/2017 | Matsutani | |
| 2018/0113655 A1 | 4/2018 | Sawata et al. | |
| 2018/0150264 A1 | 5/2018 | Oguma et al. | |
| 2018/0264863 A1 | 9/2018 | Ramirez | |

FOREIGN PATENT DOCUMENTS

| | | |
|---|---|---|
| JP | 2012-145985 A | 8/2012 |
| JP | 2016-162137 A | 9/2016 |
| JP | 2016212855 A | 12/2016 |

OTHER PUBLICATIONS

Office Action dated Jul. 25, 2019 from related U.S. Appl. No. 16/142,278.

Office Action dated Nov. 18, 2019 related U.S. Appl. No. 16/142,278.

Notice of Allowance dated Mar. 30, 2020 from related U.S. Appl. No. 16/142,278.

Official Action dated Oct. 26, 2021 received from the Japanese Patent Office in related JP 2017-18960 together with English language translation.

* cited by examiner

20

20

20

PRINT PREVIEW
(Page 1)

130

It is not possible to execute the label
printing with the current
version of the firmware.
It will be notified upon the update.

OK

LABEL

PRINT

INFORMATION PROCESSING DEVICE FOR DETERMINING WHETHER UPDATING THE FIRMWARE OF AN MFP IS NECESSARY

CROSS-REFERENCE TO RELATED APPLICATION

This application is a continuation application of U.S. Ser. No. 16/142,278 filed on Sep. 26, 2018 and claims priority from Japanese Patent Application No. 2017-189650 filed on Sep. 29, 2017, the entire subject matter of which is incorporated herein by reference.

TECHNICAL FIELD

This disclosure relates to a non-transitory computer-readable medium having control instructions which is readable by a computer of an information processing device capable of performing communications with an image processing apparatus, and the like.

BACKGROUND ART

Some image processing apparatus are configured to execute a variety of processing, in accordance with operations of firmware. A version of the firmware is updated for adding functions and the like. For this reason, if the version-up of the firmware, i.e., the update of the firmware is not performed, specific processing may not be executed by the image processing apparatus.

SUMMARY

This disclosure is provided to suitably execute specific processing by an image processing apparatus.

A non-transitory computer-readable medium having control instructions of this disclosure controls a computer of an information processing device including a communication interface used to perform communications with an image processing apparatus, and the control instructions cause the computer to perform: determining whether updating of firmware of the image processing apparatus is necessary to execute specific processing in the image processing apparatus; and outputting information based on a result of the determining.

According to the control instructions and the like disclosed in the illustrative embodiment, in the information processing device capable of performing communications with the image processing apparatus, the computer determines whether the update of the firmware of the image processing apparatus is required so as to execute the specific processing in the image processing apparatus. Then, the information based on a determination result thereof is output. Thereby, the firmware of the image processing apparatus is updated, as necessary, so that it is possible to favorably execute the specific processing by the image processing apparatus.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

<Configuration of Communication System>

Figure 1:
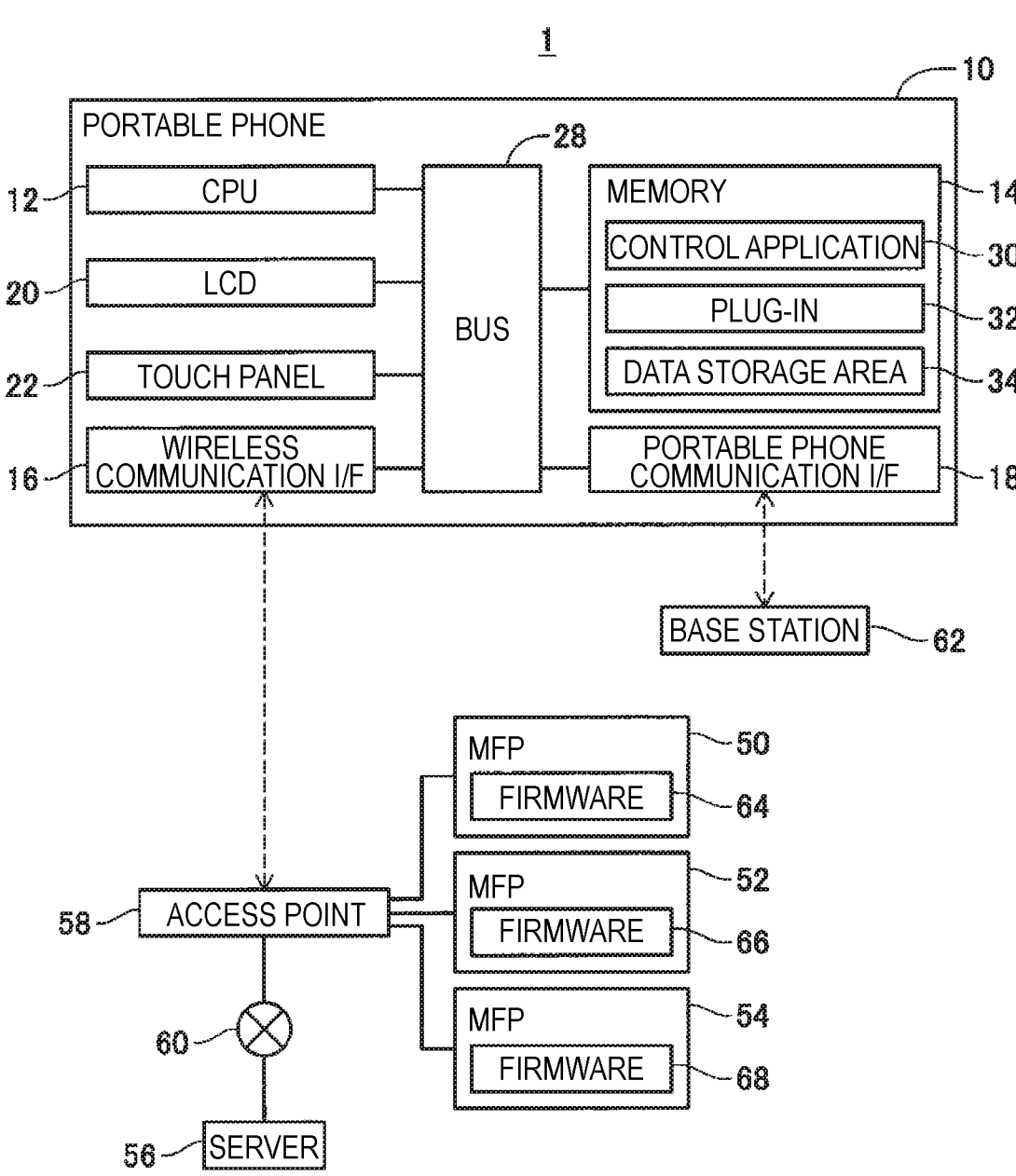
FIG. 1 is a block diagram of a communication system 1.

FIG. 1 is a block diagram of a communication system 1 exemplified as an illustrative embodiment of the present disclosure. The communication system 1 includes a portable phone (an example of the information processing device of the present disclosure) 10, MFPs (abbreviation of Multi-function Peripheral) (an example of the image processing apparatus of the present disclosure) 50, 52, 54, a server 56, an access point 58, the Internet 60, and a base station 62. The MFPs 50, 52, 54 include firmware 64, 66, 68, respectively, and is able to execute a variety of processing such as copy processing, scan processing, fax transmission and receiving processing and the like by operations of the respective firmware 64, 66, 68. The server 56 is a server configured to store therein the latest versions of the firmware of the MFPs 50, 52, 54 and to provide the same. The access point 58 has functions as a wireless LAN access point and a router. In the meantime, the server 56 is connected to the Internet 60 and performs communications with an external apparatus via the access point 58.

A configuration of the portable phone 10 is described. The portable phone 10 mainly has a CPU (abbreviation of Central Processing Unit) (an example of the computer and the controller of the present disclosure) 12, a memory 14, a wireless communication I/F (an example of the communication interface of the present disclosure) 16, a portable phone communication I/F 18, an LCD (abbreviation of liquid crystal display) 20, and a touch panel 22. The elements perform communications with each other via a bus 28.

The wireless communication I/F 16 performs wireless communications in a Wi-Fi (R) (registered trademark of Wi-Fi Alliance) method (occasionally referred to as 'WF method') based on IEEE 802.11 standard or one related thereto. That is, when the portable phone 10 accesses the access point 58 and is thus in a state where it is able to perform wireless communications in the WF method, the portable phone 10 is able to perform data communications with the MFPs 50, 52, 54 and the server 56 via the access point 58.

The portable phone communication I/F 18 performs wireless communications in a portable phone communication method between the portable phone and the base station 62. That is, when the portable phone 10 is in a state where it is able to perform wireless communications in the portable phone communication method, the portable phone 10 is able to perform data communications via the base station 62.

The CPU 12 is configured to execute processing, in accordance with a control application (an example of the control instructions of the present disclosure) 30 or a plug-in (an example of the generating instructions of the present disclosure) 32 in the memory 14. The control application 30 is a program for enabling the MFPs 50, 52, 54 to execute a variety of processing by using the portable phone 10. The plug-in 32 is a program that is able to add a new function to the control application 30. Specifically, the plug-in 32 is a program for preparing image data for label printing and enabling the MFPs 50, 52, 54 to execute label printing processing by an operation of the control application 30. In the meantime, the CPU 12 configured to execute the control application 30 and the like may also be described with a program name. For example, the description "the control application 30 is" may mean "the CPU 12 executing the control application 30 is".

Also, the memory 14 has a data storage area 34. The data storage area 34 is an area in which data and the like necessary to execute the control application 30 and the like is stored. In the meantime, the memory 14 is configured by a combination of a RAM (abbreviation of Random Access Memory), a ROM (abbreviation of Read Only Memory), a flash memory, an HDD (abbreviation of Hard Disk Drive), a buffer of the CPU 12, and the like.

The LCD 20 has a display surface for displaying diverse functions of the portable phone 10. The touch panel 22 includes a touch sensor and is arranged to cover the display surface of the LCD 20. The touch panel 22 is configured to detect approach/touch of a user's finger, a touch pen and the like to the touch panel 22 and to output an electric signal in accordance with the detection.

<Operations of Communication System>

In the communication system 1, the plug-in 32 of the portable phone 10 prepares image data for label printing and the control application 30 transmits the image data for label printing to the MFP 50 and the like, so that label printing processing is executed in the MFP 50 and the like. However, all of the MFPs 50, 52, 54 capable of performing communications with the portable phone 10 are not configured to execute the label printing processing.

Specifically, although the MFP 50 is able to execute the label printing processing, the MFP 52 cannot execute the label printing processing. Also, although the MFP 54 is able to structurally execute the label printing processing, it cannot execute the label printing processing unless the version of the firmware 68 of the MFP 54 is updated to a predetermined version or higher. That is, the MFP 54 is able to execute the label printing processing when the version of the firmware 68 is updated to a predetermined version or higher. For this reason, in a communication system of the related art, if a user does not execute the version update of the firmware 68 of the MFP 54, it is not possible to execute the label printing processing by the MFP 54. On the other hand, in the communication system 1, when the image data for label printing is prepared, the update of the firmware 68 of the MFP 54 is suggested. Then, when the firmware 68 is updated, it is possible to execute the label printing processing by the MFP 54.

Figure 2:
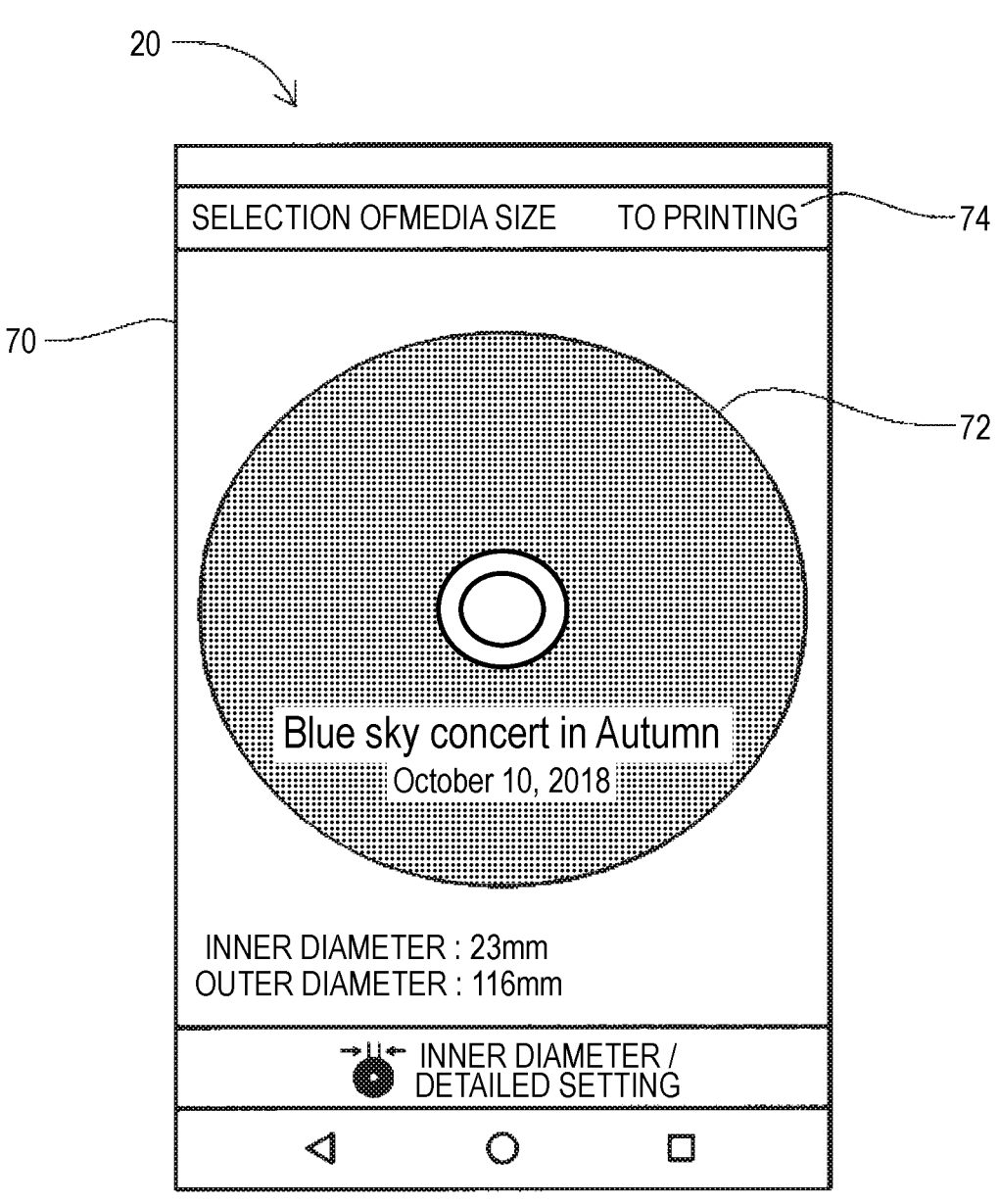
FIG. 2 illustrates a preparation image display screen 70.

Specifically, the plug-in 32 of the portable phone 10 prepares the image data for label printing. In the meantime, the image data for label printing is prepared by a well-known method. When the plug-in 32 prepares the image data for label printing, it displays a preparation image display screen 70 on the LCD 20 of the portable phone 10, as shown in FIG. 2. In the preparation image display screen 70, an image 72 based on the prepared image data for label printing and a print button 74 are displayed.

Then, when the print button 74 is operated, the plug-in 32 outputs the image data for label printing to the control application 30. At this time, the plug-in 32 outputs not only the image data for label printing but also information indicating that the image data is image data for label printing and correspondence model information to the control application 30. In the meantime, the correspondence model information is model information indicating whether a model corresponds to the label printing processing.

Specifically, the correspondence model information includes a white list, a black list and a gray list. The white list is configured by model information of the MFP 50 and the like capable of executing the label printing processing. Also, the black list is configured by model information of the MFP 52 and the like incapable of executing the label printing processing. Also, the gray list is configured by model information of the MFP 54 and the like capable of executing the label printing processing by the version update and information relating to a version necessary to execute the label printing processing (hereinafter, referred to as "requisite version information"). Although described in detail later, in a predetermined case, the gray list may be configured only by the model information, without the requisite version information.

Figure 3:
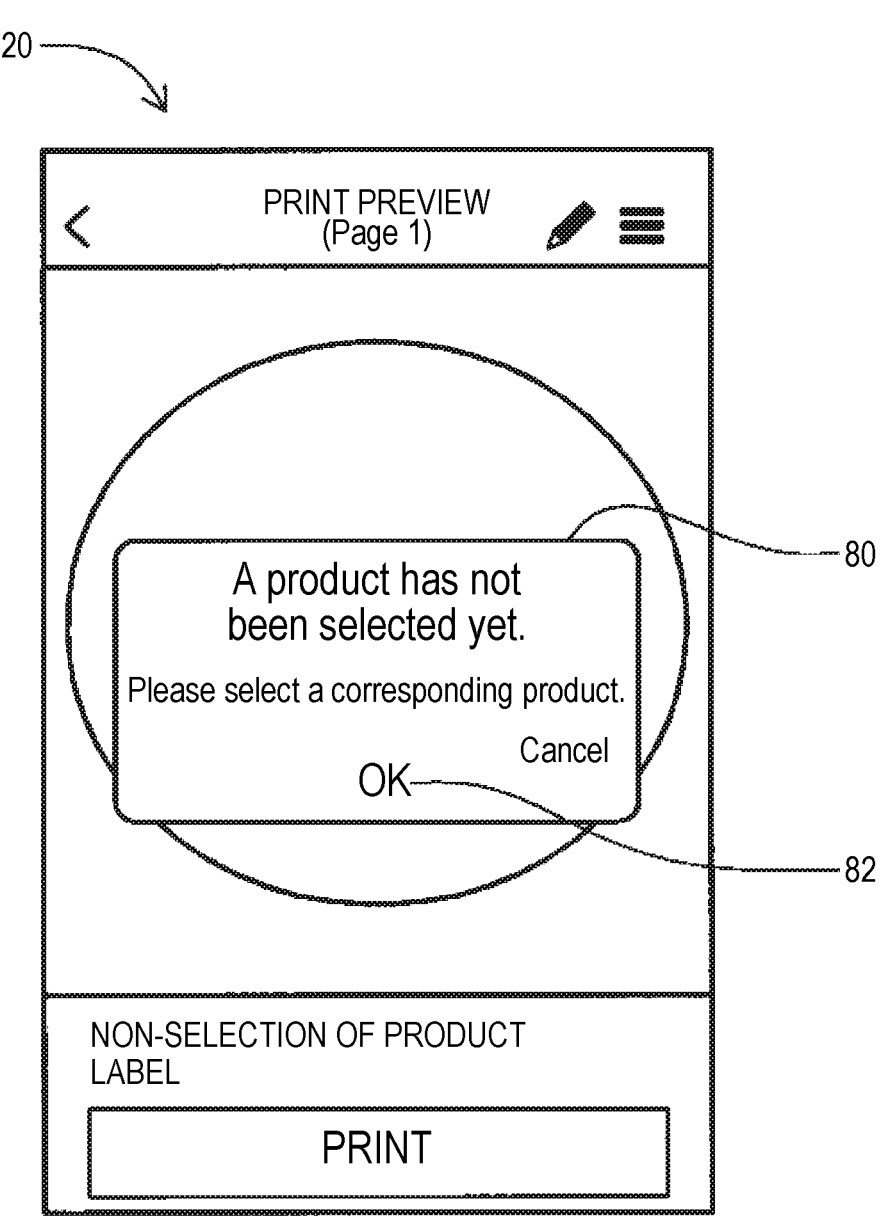
FIG. 3 illustrates a first error screen 80.

When the image data for label printing is received, the control application 30 determines whether a device for executing the label printing processing has been selected. In this description, since device selection has not been described yet, in this determination, the control application 30 determines that a device for executing the label printing processing has not been selected. At this time, the control application 30 displays a first error screen 80 shown in FIG. 3 on the LCD 20. In the first error screen 80, a comment indicating that a device for executing the label printing processing has not been selected is displayed.

Then, when the user operates an OK button 82 in the first error screen 80, the control application 30 searches for a device capable of performing communications with the portable phone 10. At this time, the control application 30 displays a search screen (not shown) on the LCD 20. In the search screen, information indicating that a device capable of performing communications with the portable phone 10 is being searched is displayed. When a device capable of performing communications with the portable phone 10, i.e., the MFPs 50, 52, 54 are searched, the control application 30 acquires the model information from each of the MFPs 50, 52, 54. Then, the control application 30 determines to which list of the correspondence model information received from the plug-in 32 the acquired model information corresponds, and displays a selection screen 84 shown in FIG. 4 on the LCD 20, in accordance with a determination result thereof.

Specifically, since the MFP 50 is able to execute the label printing processing, as described above, the model information acquired from the MFP 50 is included in the white list. The model information included in the white list is displayed as a first selection button 86 having a model name corresponding to the model information in the selection screen 84. Also, since the MFP 52 cannot execute the label printing processing, as described above, the model information acquired from the MFP 52 is included in the black list. The model information included in the black list is displayed as a second selection button 88 having a model name corresponding to the model information in the selection screen 84. However, the second selection button 88 is displayed in a gray-out form. That is, the model information included in the black list, i.e., a selection button of a device incapable of executing the label printing processing is displayed in an unselectable manner in the selection screen 84.

Also, since the MFP 54 is able to execute the label printing processing if the version of the firmware 68 is updated, as described above, the model information acquired from the MFP 54 is included in the gray list. The model information included in the gray list is displayed as a third selection button 90 having a model name corresponding to the model information in the selection screen 84. However, since updating of the version of the firmware 68 of the MFP 54 is necessary to execute the label printing processing, information about a version necessary to execute the label printing processing, i.e., the requisite version information is displayed in association with the third selection button 90.

Like this, the control application 30 displays the second selection button 88 for selecting the device (the MFP 52) corresponding to the model information included in the black list in an unselectable manner in the selection screen 84, and displays the first selection button 86 and the third selection button 90 for selecting the devices (the MFPs 50, 54) corresponding to the model information included in the white list or the gray list in an selectable manner in the selection screen 84.

Then, when the first selection button 86 is operated in the selection screen 84, i.e., the MFP 50 is selected as a device (hereinafter, referred to as "selected device") for executing the label printing processing, the control application 30 inquires of the selected device whether it is possible to execute the label printing processing. Specifically, the control application 30 transmits a command, which instructs the selected device to transmit information (hereinafter, referred to as "executability information") indicating whether it is possible to execute the label printing processing to the portable phone 10, to the selected device. In the meantime, information indicating that it is possible to execute the label printing processing is set as the executability information in the MFP 50. For this reason, when the MFP 50 receives the transmission command of the executability information from the portable phone 10, the MFP 50 returns information, which indicates that it is possible to execute the label printing processing, to the portable phone 10, as the executability information.

Figure 5:
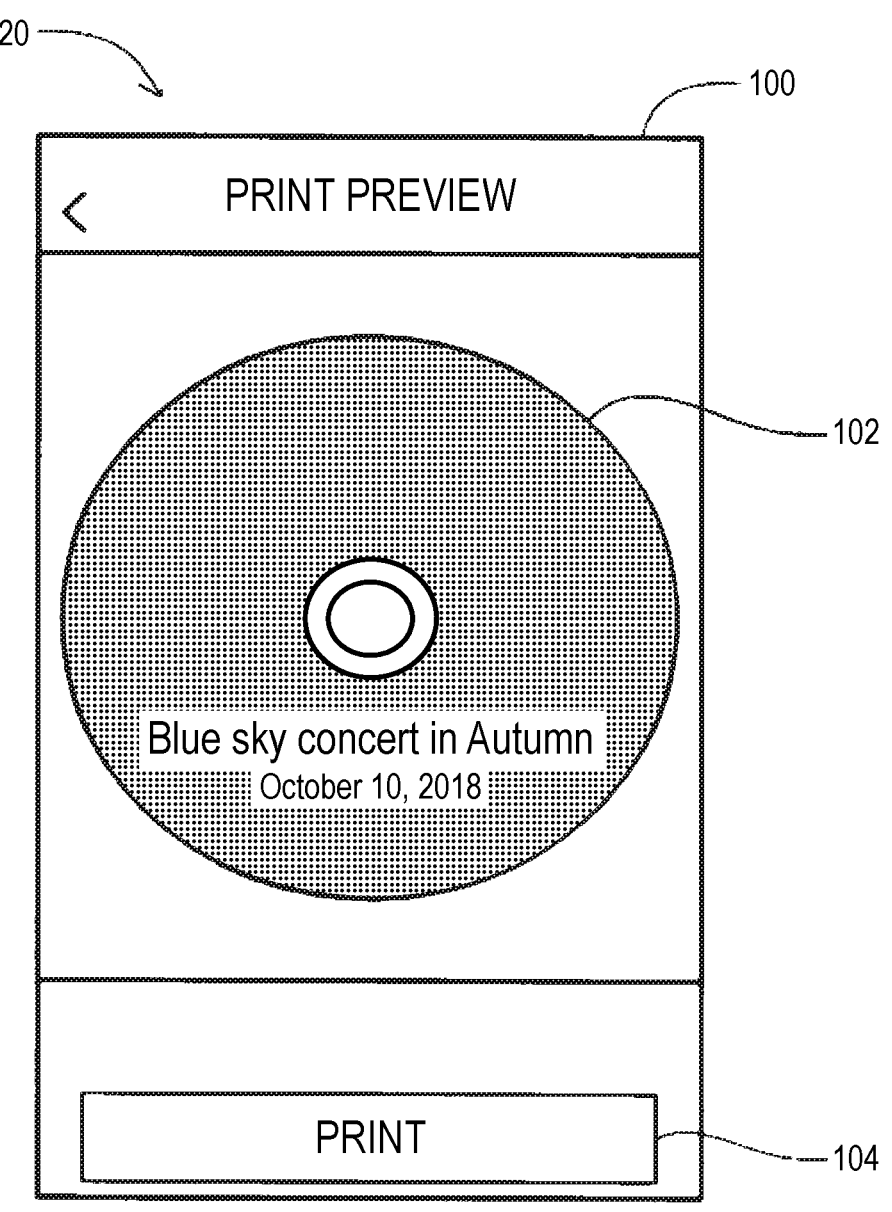
FIG. 5 illustrates a preview screen 100.

Thereby, it is confirmed that the label printing processing can be executed in the MFP 50. In the meantime, although it is confirmed the label printing processing can be executed in that the MFP 50 at a point of time at which it is recognized that the model information of the MFP 50 is included in the white list, the certainty is increased by the inquiry to the MFP 50. Then, when the information, which indicates that it is possible to execute the label printing processing, is received from the MFP 50, as the executability information, the control application 30 displays a preview screen 100 shown in FIG. 5 on the LCD 20.

In the preview screen 100, an image 102 based on the image data for label printing received from the plug-in 32 and a print button 104 are displayed. When the print button 104 is operated, the control application 30 transmits the image data for label printing to the selected device, i.e., the MFP 50, together with a printing command. Thereby, the label printing processing is executed in the MFP 50.

Figure 4:
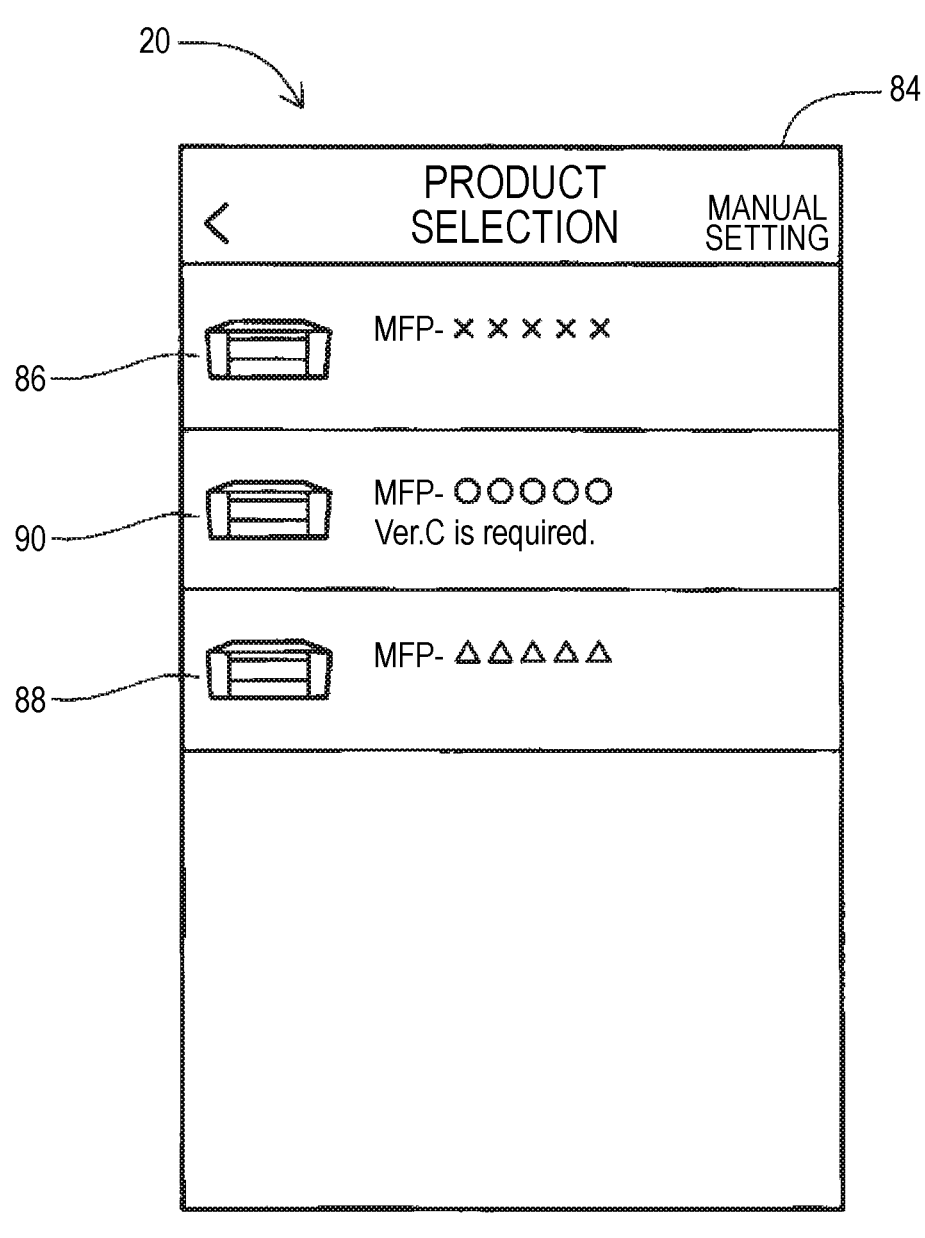
FIG. 4 illustrates a selection screen 84.

Also, when the third selection button 90 is operated in the selection screen 84 shown in FIG. 4, i.e., the MFP 54 is selected as a selected device, the control application 30 inquires of the MFP 54 whether it is possible to execute the label printing processing. In the meantime, since the MFP 54 is a device that is able to execute the label printing processing by the version-up of the firmware 68, the MFP 54 determines whether it is possible to execute the label printing processing by the version of the firmware 68 stored therein.

Specifically, in the MFP 54, the information about the version of the firmware 68 necessary to execute the label printing processing, i.e., the requisite version information is stored. For this reason, the MFP 54 compares the version of the firmware 68 stored therein and a version corresponding to the requisite version information. At this time, when the version of the firmware 68 stored in the MFP 54 and the version corresponding to the requisite version information are the same or when the version of the firmware 68 stored in the MFP 54 is newer than the version corresponding to the requisite version information, the MFP 54 determines that it is possible to execute the label printing processing. On the other hand, when the version of the firmware 68 stored in the MFP 54 is older than the version corresponding to the requisite version information, the MFP 54 determines that it is not possible to execute the label printing processing.

For this reason, when the inquiry is received from the control application 30, the MFP 54 transmits information corresponding to the determination result to the portable phone 10, as the executability information. That is, when it is determined that it is possible to execute the label printing processing in the MFP 54, the MFP 54 returns information, which indicates that it is possible to execute the label printing processing, to the portable phone 10, as the executability information. When the information, which indicates that it is possible to execute the label printing processing, is received from the MFP 54, as the executability information, the control application 30 displays the preview screen 100 on the LCD 20. Then, when the print button 104 of the preview screen 100 is operated, the label printing processing is executed in the MFP 54, as described above.

On the other hand, when it is determined that it is not possible to execute the label printing processing in the MFP 54, the MFP 54 returns information, which indicates that it is not possible to execute the label printing processing, to the portable phone 10, as the executability information. At this time, the control application 30 determines whether the model information of the selected device (the MFP 54), which is a device of the transmission source of the executability information, is included in the gray list. That is, the control application 30 determines whether the selected device is a device capable of executing the label printing processing by the update of the firmware. In other words, the control application 30 determines whether updating of the firmware is necessary so that the selected device is able to execute the label printing processing.

Figure 6:
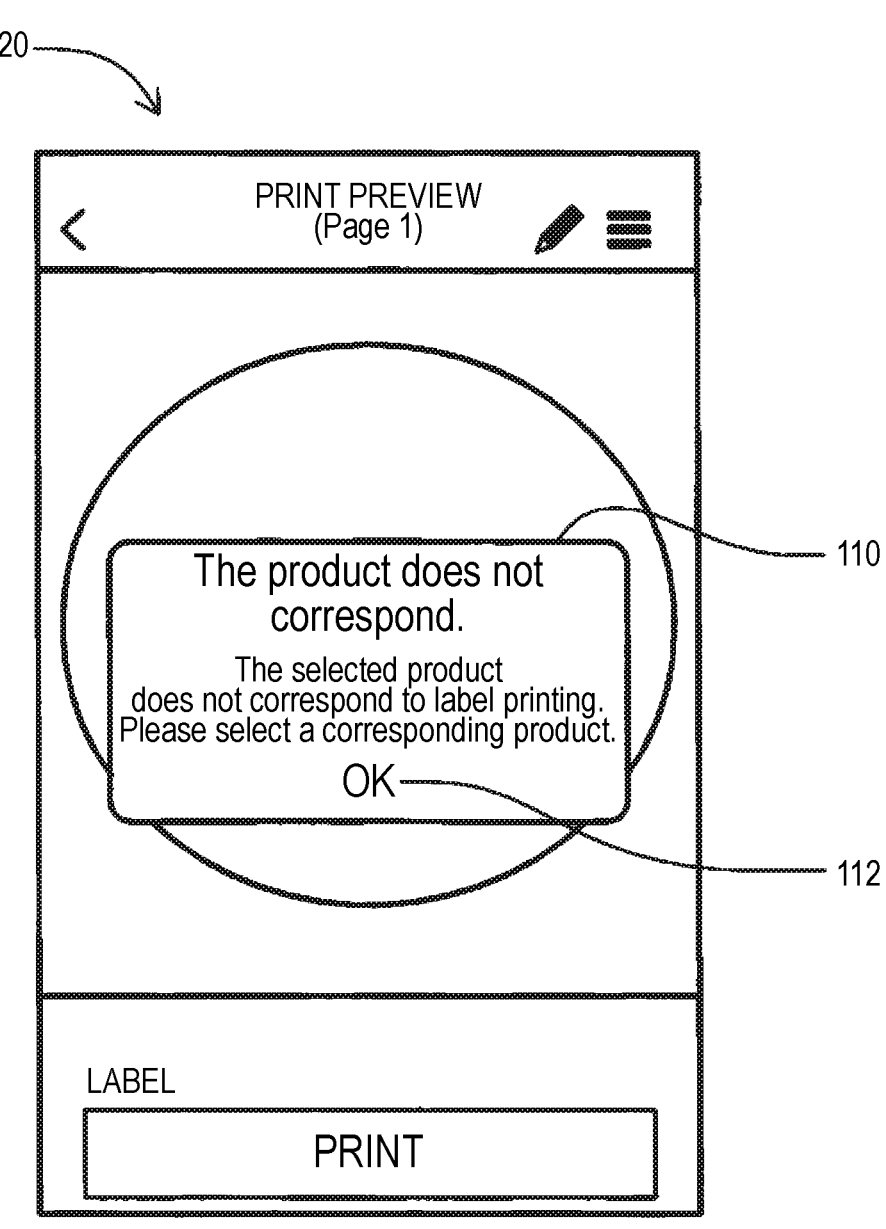
FIG. 6 illustrates a second error screen 110.

At this time, when it is determined that the model information of the selected device is not included in the gray list, i.e., when it is determined that the selected device is a device that cannot execute the label printing processing even if the firmware is updated, the control application 30 displays a second error screen 110 shown in FIG. 6 on the LCD 20. Thereby, the user recognizes that the selected device, i.e., the MFP 54 cannot the label printing processing. Then, when the OK button 112 of the second error screen 110 is operated, the control application 30 displays the selection screen 84 on the LCD 20, so that reselection of a selected device is executed.

Figure 7:
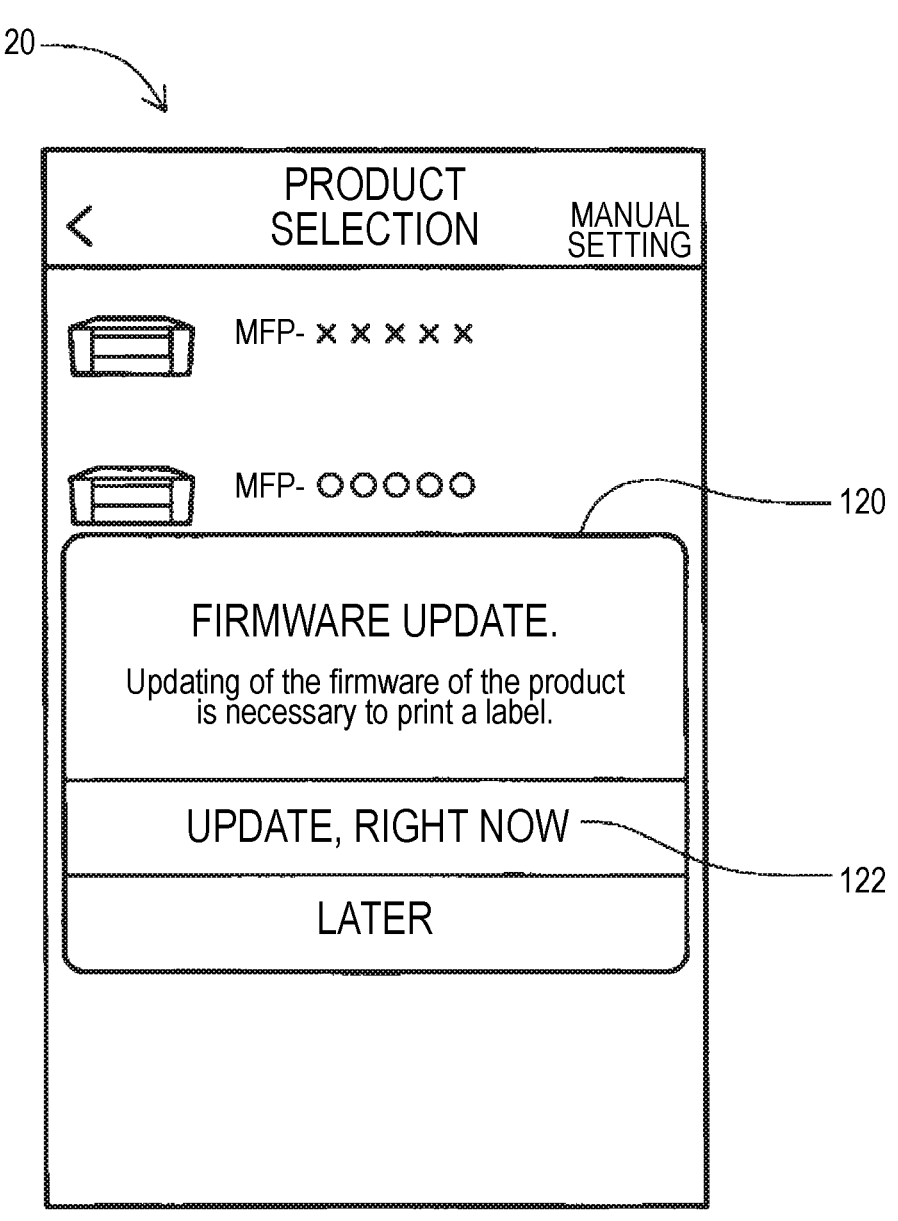
FIG. 7 illustrates a confirmation screen 120.

On the other hand, when the control application 30 determines that the model information of the selected device is included in the gray list, i.e., that the selected device is a device that is able to execute the label printing processing if the firmware is updated, the control application 30 displays a confirmation screen 120 shown in FIG. 7 on the LCD 20. The confirmation screen 120 is a screen for confirming whether or not to execute the version update of the firmware. When an update button 122 is operated in the confirmation screen 120, the version-up of the firmware is executed.

Specifically, when the update button 122 of the confirmation screen 120 is operated, the control application 30 accesses the server 56. Since the server 56 has the latest versions of the firmware of the MFPs 50, 52, 54, as described above, the control application 30 acquires, from the server 56, information (hereinafter, referred to as "latest version information") about the latest version of the firmware 68 of the selected device, i.e., the MFP 54. Then, the control application 30 compares a version (hereinafter, referred to as "latest version") corresponding to the latest version information acquired from the server 56 and a version (hereinafter, referred to as "requisite version") corresponding to the requisite version information included in the gray list.

At this time, when the latest version and the requisite version are the same or the latest version is newer than the requisite version, the control application 30 transmits an update command of the firmware 68 to the MFP 54. In the meantime, the MFP 54 has information for accessing the server 56. Therefore, the MFP 54 accesses the server 56 by using the information, and executes the version-up of the firmware 68. At this time, the version of the firmware 68 of the MFP 54 is updated to the latest version. Since the latest version is the same as the requisite version or is newer than the requisite version, when the version of the firmware 68 of the MFP 54 and the requisite version are compared in the MFP 54, it is determined that the version of the firmware 68 is the same as the requisite version information or the version of the firmware 68 is newer than the requisite version. That is, the version-up of the firmware 68 is executed in the MFP 54, so that it is determined that the label printing processing can be executed.

Also, after transmitting the version update command to the MFP 54, the control application 30 again inquiries of the MFP 54 whether it is possible to execute the label printing processing. That is, the control application 30 again transmits the transmission command of the executability information to the MFP 54. At this time, since it has been determined in the MFP 54 that it is possible to execute the label printing processing, the MFP 54 returns information, which indicates that it is possible to execute the label printing processing, to the portable phone 10, as the executability information. When the information, which indicates that it is possible to execute the label printing processing, is received from the MFP 54, as the executability information, the control application 30 displays the preview screen 100 on the LCD 20. Then, when the print button 104 of the preview screen 100 is operated, the label printing processing is executed in the MFP 54, as described above.

In the meantime, after the latest version of the firmware is released as firmware for adding a function for executing the label printing processing, the latest version is the same as the requisite version or is newer than the requisite version all the time. That is, when it is known that the latest version of the firmware is released as the firmware for adding a function for executing the label printing processing, the control application 30 is able to transmit the version update command to the selected device without comparing the latest version and the requisite version.

Therefore, when it is known that the latest version of the firmware is released as the firmware for adding a function for executing the label printing processing, the gray list that includes only the model information of the device using the firmware and does not include the requisite version information is set in the plug-in 32. For this reason, the gray list that is output from the plug-in 32 to the control application 30 may include only the model information without the requisite version information. In this case, the control application 30 transmits the version update command to the selected device without the acquisition of the latest version information from the server 56 and the comparison of the latest version and the requisite version.

That is, in the above example, when the update button 122 of the confirmation screen 120 is operated, the control application 30 acquires the latest version information from the server 56. However, after the update button 122 is operated, the control application 30 determines whether the requisite version information is included in the gray list, together with the model information of the selected device. When it is determined that the requisite version information is included in the gray list, together with the model information of the selected device, the control application 30 executes the acquisition of the latest version information from the server 56 and the comparison of the latest version and the requisite version in accordance with the above sequence, and then executes the processing thereafter.

On the other hand, when it is determined that the requisite version information is not included in the gray list, together with the model information of the selected device, the control application 30 transmits the version update command to the selected device without the acquisition of the latest version information from the server 56 and the comparison of the latest version and the requisite version, and then executes the processing thereafter in accordance with the above sequence. Thereby, it is possible to omit the execution of useless processing.

Like this, when the image data for label printing is prepared by the plug-in 32 of the portable phone 10, the image data and the correspondence model information are output to the control application 30 and it is determined whether the selected device is a device capable of executing the label printing processing through the version update of the firmware by using the gray list including the correspondence model information. When it is determined that the selected device is a device capable of executing the label printing processing through the version update of the firmware, the firmware update of the selected device is automatically executed, so that the label printing processing is executed by the selected device. Thereby, it is possible to execute the label printing processing by the selected device even if the user does not execute the version-up of the firmware of the selected device.

Also, when the control application 30 acquires the latest version information from the server 56 and compares the latest version and the requisite version, if the latest version and the requisite version are the same or the latest version is newer than the requisite version, the control application 30 transmits the version update command to the MFP 54, as described above. Then, the MFP 54 updates the version of the firmware 68, so that the version of the firmware 68 of the MFP 54 becomes the same as the requisite version or becomes newer than the requisite version and the label printing processing can be thus executed in the MFP 54. On the other hand, when the latest version is older than the requisite version, even if the MFP 54 updates the version of the firmware 68, the version of the firmware 68 of the MFP 54 is older than the requisite version. For this reason, even if the MFP 54 updates the version of the firmware 68, the label printing processing cannot be executed in the MFP 54.

Figure 8:
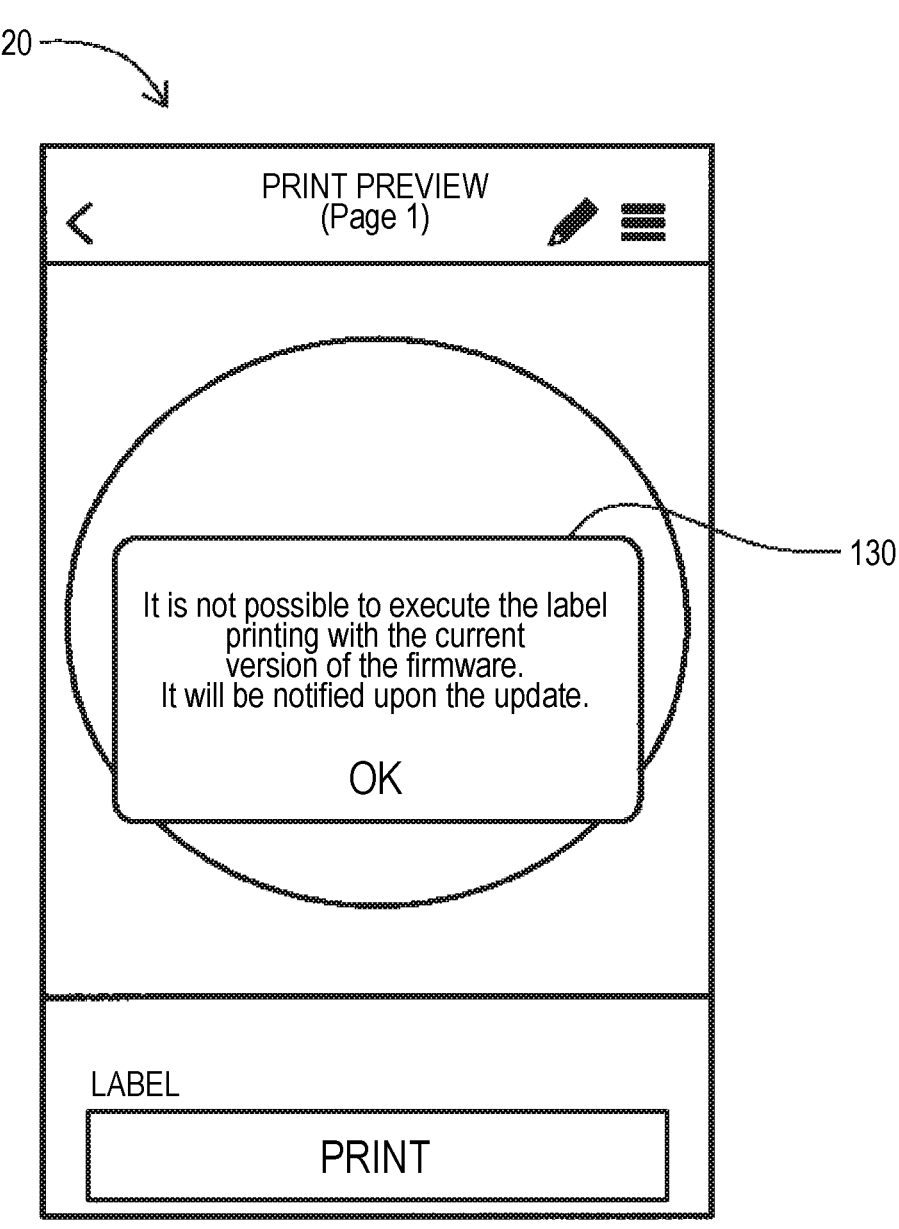
FIG. 8 illustrates a third error screen 130.

Therefore, when the control application 30 acquires the latest version information from the server 56 and compares the latest version and the requisite version, if the latest version is older than the requisite version, the control application 30 displays a third error screen 130 shown in FIG. 8 on the LCD 20. In the third error screen 130, a comment indicating that it is not possible to execute the label printing processing with the current version of the firmware and a comment indicating that a notice will be made when a version capable of executing the label printing processing is released are displayed. Thereby, the user is able to recognize that although the label printing processing cannot be currently executed by the selected device, when a new version of the firmware is released, the label printing processing will be able to be executed by the selected device.

Figure 9:
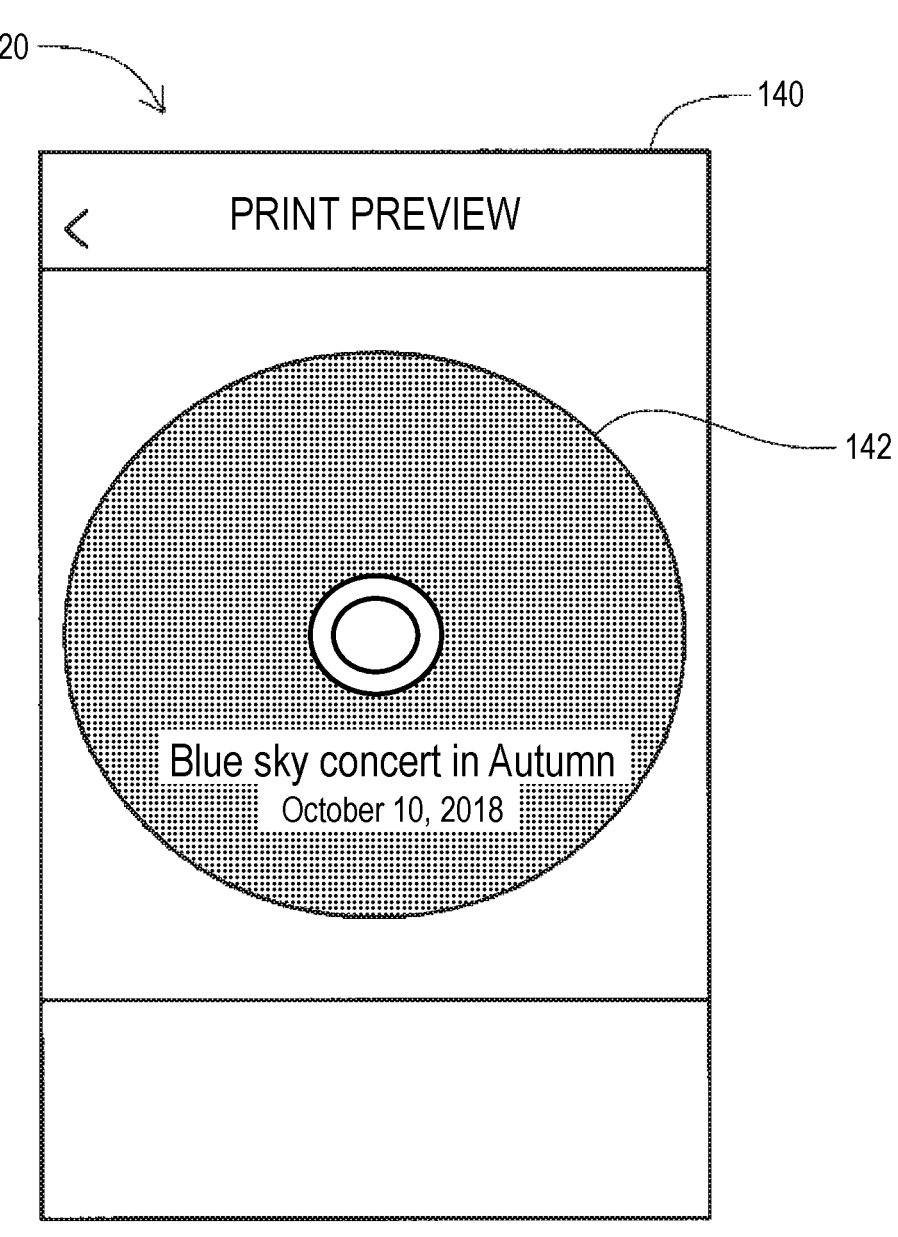
FIG. 9 illustrates a preview screen 140.

Also, when the latest version and the requisite version are compared, if the latest version is older than the requisite version, the control application 30 stores, in the data storage area 34, the image data for label printing received from the plug-in 32. Then, the control application 30 displays a preview screen 140 shown in FIG. 9 on the LCD 20. In the preview screen 140, an image 142 based on the image data for label printing is displayed, like the preview screen 100 of FIG. 5. However, the print button 104 is not displayed, unlike the preview screen 100. The reason is that the label printing processing cannot be executed in the selected device.

In the meantime, when the latest version and the requisite version are compared, if the latest version is older than the requisite version, the control application 30 sets a firmware update confirmation flag to ON. The firmware update confirmation flag set to ON is stored in the data storage area 34 in association with the model information of the selected device. When the firmware update confirmation flag is set to ON, the control application 30 periodically accesses the server 56 and acquires the latest version information corresponding to the model information associated with the flag. Then, the control application 30 compares the latest version corresponding to the acquired latest version information and the requisite version corresponding to the model information associated with the flag. At this time, when the latest version is the same as the requisite version or is newer than the requisite version, the control application 30 displays a confirmation screen 120 shown in FIG. 7. Thereby, when a version of the firmware capable of executing the label printing processing is released, the fact is notified to the user and the firmware of the previously selected device can be updated to a version capable of executing the label printing processing.

<Processing of Control Application>

The label printing processing is performed as the CPU 12 executes the control application 30. In the below, processing that is performed upon execution of a flow of the control application 30 is described with reference to FIGS. 10 to 12.

Figure 10:
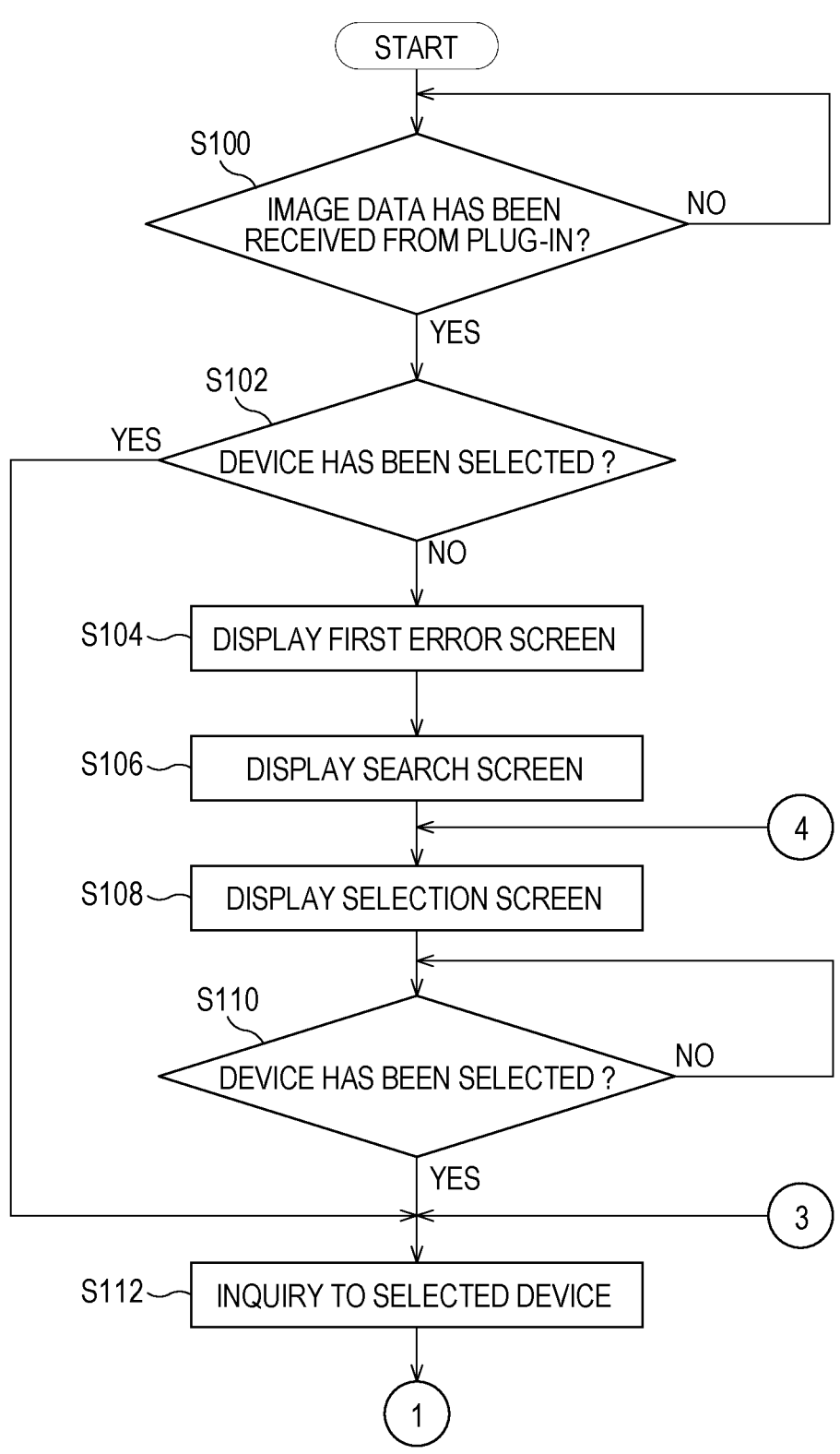
FIG. 10 is a flowchart of a control application 30.

First, the CPU 12 determines whether the image data for label printing has been received from the plug-in 32 (refer to FIG. 10: S100). When it is determined that the image data has not been received from the plug-in 32 (S100: NO), the processing of S100 is repetitively executed. On the other hand, when it is determined that the image data has been received from the plug-in 32 (S100: YES), the CPU 12 determines whether a device for executing the label printing processing, i.e., a selected device has been selected (S102).

When it is determined that the selected device has not been selected (S102: NO), the CPU 12 displays the first error screen 80 on the LCD 20 (S104). Then, the CPU 12 displays the search screen on the LCD 20 (S106). Subsequently, the CPU 12 prepares the selection screen 84 based on the correspondence model information, and displays the selection screen 84 on the LCD 20 (S108). Then, the CPU 12 determines whether the selected device has been selected through an operation on the selection screen 84 (S110).

When it is determined that the selected device has not been selected (S110: NO), the processing of S110 is repetitively executed. On the other hand, when it is determined that the selected device has been selected (S110: YES), the CPU 12 proceeds to S112. Also, when it is determined in S102 that the selected device has been selected (S102: YES), the CPU 12 proceeds to S112.

In S112, the CPU 12 inquires of the selected device whether it is possible to execute the label printing processing (S112). That is, the CPU 12 transmits the transmission command of the executability information to the selected device. Then, the CPU 12 receives the executability information from the selected device, as a reply to the inquiry (refer to FIG. 11: S114). Then, the CPU 12 determines whether it is possible to execute the label printing processing in the selected device, based on the received executability information (S116).

When it is determined that it is not possible to execute the label printing processing in the selected device (S116: NO), the CPU 12 determines whether the model information of the selected device is included in the gray list (S118). When it is determined that the model information of the selected device is included in the gray list (S118: YES), the CPU 12 displays the confirmation screen 120 on the LCD 20 (refer to FIG. 12: S119).

Then, when the update button 122 is operated in the confirmation screen 120, the CPU 12 determines whether the requisite version information has been added to the model information of the selected device included in the gray list (S120). When it is determined that the requisite version information has been added to the model information of the selected device included in the gray list (S120: YES), the CPU 12 accesses the server 56 and acquires the latest version information from the server 56 (S122).

Then, the CPU 12 determines whether the latest version is the same as the requisite version or is newer than the requisite version (S124). When it is determined that the latest version is the same as the requisite version or is newer than the requisite version (S124: YES), the CPU 12 proceeds to S126. Also, when it is determined in S120 that the requisite version information has not been added to the model information of the selected device included in the gray list (S120: NO), the CPU 12 proceeds to S126.

In S126, the CPU 12 transmits the version update command of the firmware to the selected device (S126). Then, the CPU 12 executes the processing of S112 (refer to FIG. 10) and thereafter.

Also, when it is determined in S116 (refer to FIG. 11) that it is possible to execute the label printing processing in the selected device (S116: YES), the CPU 12 displays the preview screen 100 on the LCD 20 (S128). Then, the CPU 12 determines whether the print button 104 of the preview screen 100 has been operated (S130). When it is determined that the print button 104 has not been operated (S130: NO), the processing of S130 is repetitively executed.

On the other hand, when it is determined that the print button 104 has been operated (S130: YES), the CPU 12 transmits the image data for label printing received from the plug-in 32 in S100 to the selected device (S132). Thereby, this flow is over.

Also, when it is determined in S118 that the model information of the selected device is not included in the gray list (S118: NO), the CPU 12 displays the second error screen 110 on the LCD 20 (S134). Then, the CPU 12 executes the processing of S108 (refer to FIG. 10) and thereafter.

Also, when it is determined in S124 (refer to FIG. 12) that the latest version is older than the requisite version (S124: NO), the CPU 12 displays the third error screen 130 on the LCD 20 (S136). Then, the CPU 12 sets the firmware update confirmation flag to ON (S138). Subsequently, the CPU 12 stores, in the data storage area 34, the image data for label printing received from the plug-in 32 in S100 (S140). Then, the CPU 12 displays the preview screen 140, in which the print button is displayed in a gray-out manner, on the LCD 20 (S142). Thereby, this flow is over.

In the meantime, the CPU 12 configured to execute the processing of S100 is an example of the first receiving processing and the second receiving processing. The CPU 12 configured to execute the processing of S114 is an example of the receiving processing. The CPU 12 configured to execute the processing of S116 is an example of the second determination processing. The CPU 12 configured to execute the processing of S118 is an example of the first determination processing. The CPU 12 configured to execute the processing of S124 is an example of the third determination processing. The CPU 12 configured to execute the processing of S126 is an example of the output processing and the transmission processing.

In the meantime, this disclosure is not limited to the illustrative embodiment, and can be implemented in a variety of aspects diversely changed and improved based on the knowledge of one skilled in the art. Specifically, for example, in the illustrative embodiment, it is determined whether the selected device is able to execute the label printing processing, and the determination result is transmitted to the portable phone 10, as the executability information. However, it may also be determined whether the portable phone 10 is able to execute the label printing processing. That is, for example, the selected device may be configured to transmit the information about the version of the firmware stored therein to the portable phone 10, and the portable phone 10 may be configured to determine whether the selected device is able to execute the label printing processing, based on the received information about the firmware and the requisite version information.

Also, in the illustrative embodiment, the control application 30 is configured to transmit the version update command of the firmware to the selected device, and the selected device is configured to update the version, in response to the command. However, the selected device may be configured to update the version in accordance with another method. For example, the control application 30 may be configured to determine whether updating of the version of the firmware of the selected device is necessary, and to transmit a determination result thereof to the selected device. The selected device may be configured to determine whether updating of the version is necessary, based on the received determination result, and may update the version when it is determined that updating of the version is necessary.

Also, in the illustrative embodiment, when it is determined that the selected device is a device capable of executing the label printing processing through the update of the version of the firmware, the version of the firmware is automatically updated, in accordance with the command of the portable phone 10. However, the version of the firmware may be updated based on a user's operation. For example, when it is determined that the selected device is a device capable of executing the label printing processing through the update of the version of the firmware, a screen indicative of the corresponding fact may be displayed on the LCD 20. Then, the user may check the screen and update the version of the firmware by a user's operation.

Also, in the illustrative embodiment, this disclosure is applied to the label printing processing, as the specific processing. However, this disclosure is not limited to the label printing processing and can be applied to a variety of image processing.

Figure 11:
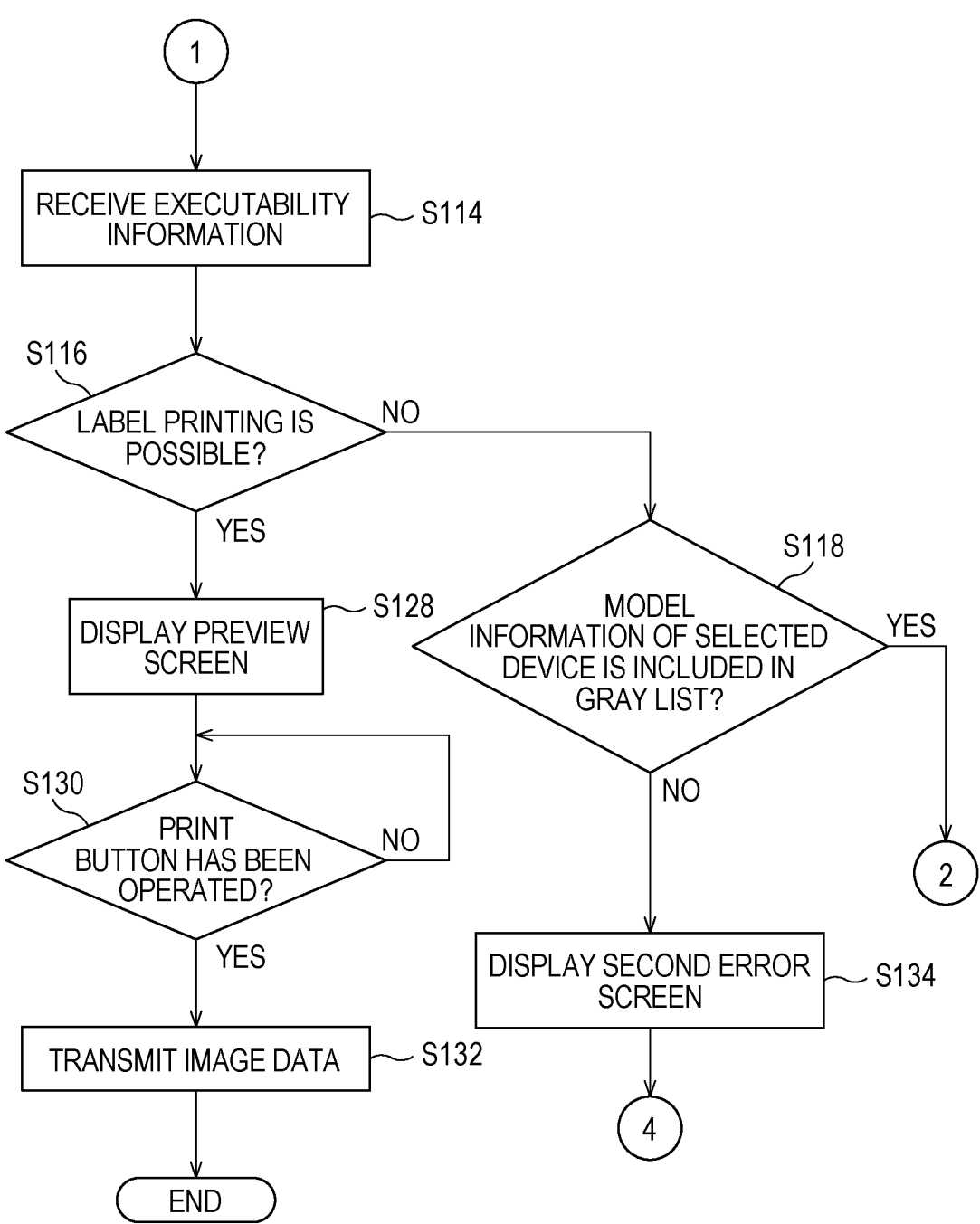
FIG. 11 is a flowchart of the control application 30.
Figure 12:
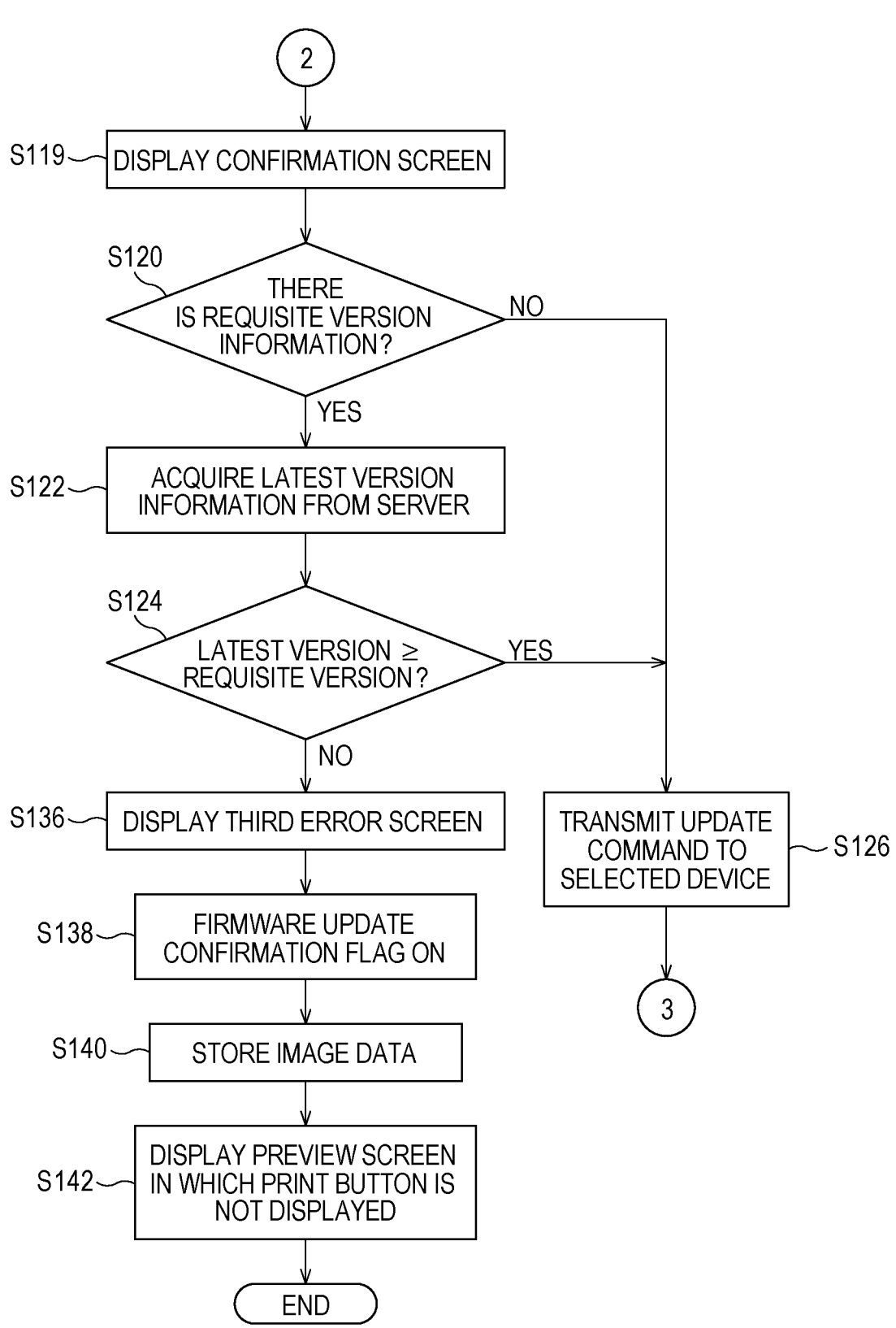
FIG. 12 is a flowchart of the control application 30.

Also, in the illustrative embodiment, the processing shown in FIGS. 10 to 12 is executed by the CPU 12.

However, the processing may also be executed by an ASIC or other logic integrated circuit, without being limited to the CPU 12. Also, the processing may be executed by cooperation of the CPU, the ASIC and other logic integrated circuit.

What is claimed is:

1. A non-transitory computer-readable medium having a control application having control instructions to control a computer of an information processing device including a communication interface used to perform communications with a printing apparatus, the computer having a plug-in for the control application, which is different from the control instructions, the plug-in supporting a specific image printing, the plug-in being configured to generate specific image data which is corresponding to the specific image printing by a specific printing apparatus and which is to be transmitted to the specific printing apparatus by the control application, and the plug-in outputting information indicative of the specific printing apparatus, the control instructions causing the computer to perform:

receiving the information indicative of the specific printing apparatus from the plug-in supporting the specific image printing;

determining, based on information received from the plug-in supporting the specific image printing, in a case where it is determined based on the information received from the plug-in supporting the specific image printing that a target printing apparatus is the specific printing apparatus, whether updating of firmware of the target printing apparatus is necessary to execute the specific image printing in the target printing apparatus; and outputting information based on a result of the determining.

2. The non-transitory computer-readable medium having the control application having the control instructions according to claim 1, wherein, in a case where it is determined that the updating of the firmware is necessary, information for updating the firmware is transmitted to the target printing apparatus via the communication interface.

3. The non-transitory computer-readable medium having the control application having the control instructions according to claim 1, wherein, in a case where any printing apparatus is selected from one or more printing apparatuses, the computer in the determining determines whether the updating of the firmware of the selected printing apparatus as the target printing apparatus is necessary.

4. The non-transitory computer-readable medium having the control application having the control instructions according to claim 1, wherein the control instructions cause the computer to determine whether the target printing apparatus is able to execute the specific image printing, and wherein, in a case where it is determined that the target printing apparatus is not able to execute the specific image printing, the computer in the determining determines whether the updating of the firmware of the target printing apparatus is necessary.

5. The non-transitory computer-readable medium having the control application having the control instructions according to claim 4, wherein the control instructions cause the computer to perform receiving executability information, which indicates whether it is possible to execute the specific image printing, from the target printing apparatus, and wherein the computer determines based on the executability information whether the target printing apparatus is able to execute the specific image printing.

6. The non-transitory computer-readable medium having the control application having the control instructions according to claim 5, wherein information about a version of the firmware stored in the target printing apparatus is received from the target printing apparatus, as the executability information.

7. The non-transitory computer-readable medium having the control application having the control instructions according to claim 1, wherein, in a case where it is determined that updating of the firmware is necessary, the control instructions cause the computer to determine whether the target printing apparatus is able to execute the specific image printing by update of the firmware of the target printing apparatus to an acquirable latest version of the firmware, and wherein in a case where it is determined that the target printing apparatus is able to execute the specific image printing, the information based on the result of the determining is output.

8. The non-transitory computer-readable medium having the control application having the control instructions according to claim 1, wherein the control instructions cause the computer to perform receiving, from the plug-in, information about a version of the firmware that is necessary for the specific printing apparatus to execute the specific image printing, and wherein the computer determines based on the information about the version whether the specific printing apparatus is able to execute the specific image processing by update of the firmware of the specific printing apparatus to an acquirable latest version of the firmware.

9. An information processing device comprising:

a communication interface used to perform communications with a printing apparatus, and a controller, wherein the controller executes a control application and a plug-in for the control application, the plug-in supporting a specific image printing, the control application having control instructions, when the control application and the plug-in are executed, the controller is configured to perform:

generating, by the plug-in, specific image data which is corresponding to the specific image printing by a specific printing apparatus and which is to be transmitted to the specific printing apparatus by the control application and outputting, by the plug-in information indicative of the specific printing apparatus;

receiving the information indicative of the specific printing apparatus from the plug-in supporting the specific image printing;

determining, based on the information received from the plug-in supporting the specific image printing, by the control application, in a case where it is determined based on the information received from the plug-in supporting the specific image printing that a target printing apparatus is the specific printing apparatus, whether updating of firmware of the target printing apparatus is necessary to execute specific image printing in the target printing apparatus; and outputting, by the control application, information based on a result of the determining.

* * * * *